Nov. 15, 1960    E. MAGNANI    2,960,058
PROPELLING DEVICE FOR A BOAT AND THE LIKE
Filed May 19, 1958    2 Sheets-Sheet 1
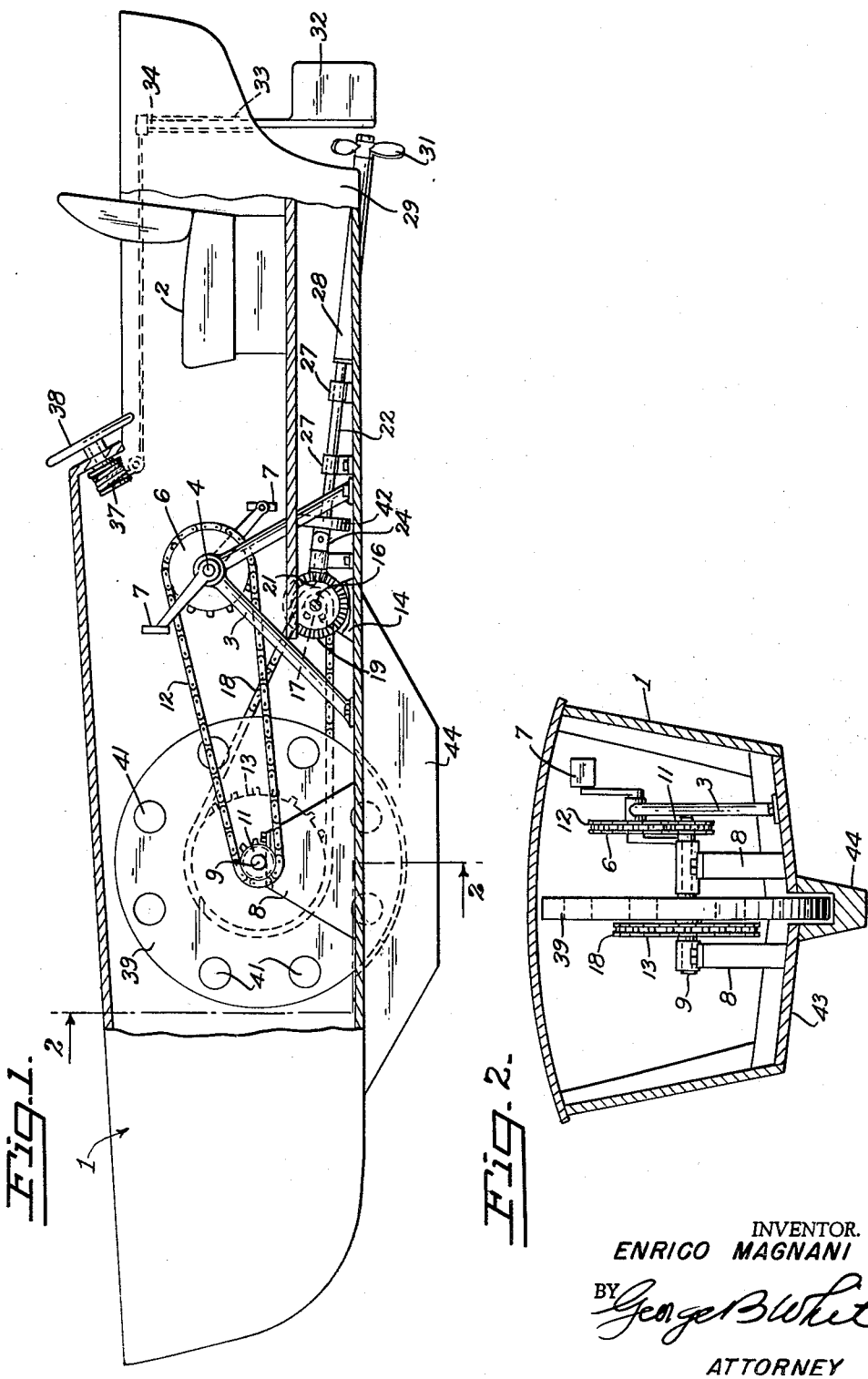
INVENTOR.
ENRICO MAGNANI
BY George B White
ATTORNEY Nov. 15, 1960 E. MAGNANI 2,960,058
PROPELLING DEVICE FOR A BOAT AND THE LIKE
Filed May 19, 1958 2 Sheets-Sheet 2

INVENTOR.
ENRICO MAGNANI
BY George B. White
ATTORNEY

United States Patent Office 2,960,058
Patented Nov. 15, 1960

2,960,058
PROPELLING DEVICE FOR A BOAT AND THE LIKE

Enrico Magnani, 718 Columbus Ave., San Francisco, Calif.

Filed May 19, 1958, Ser. No. 736,207

2 Claims. (Cl. 115—25)

This invention relates to a propelling device for a boat and the like.

The primary object of the invention is to provide a foot pedalled propelling device for a boat which can be conveniently and compactly assembled in a boat in such position that the person riding in the boat can propel the boat by turning the pedals by his feet and at the same time leave his hands free to steer the boat in the usual manner.

Particularly an object of this invention is to provide bicycle type riding mechanism for the propeller of a boat, in which the power is transmitted so as to greatly facilitate the propelling of the boat at desired speed.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a partly sectional side view of a boat with my boat propelling mechanism therein.

Fig. 2 is a cross-sectional view of the boat, on lines 2—2 of Fig. 1.

Figure 3:
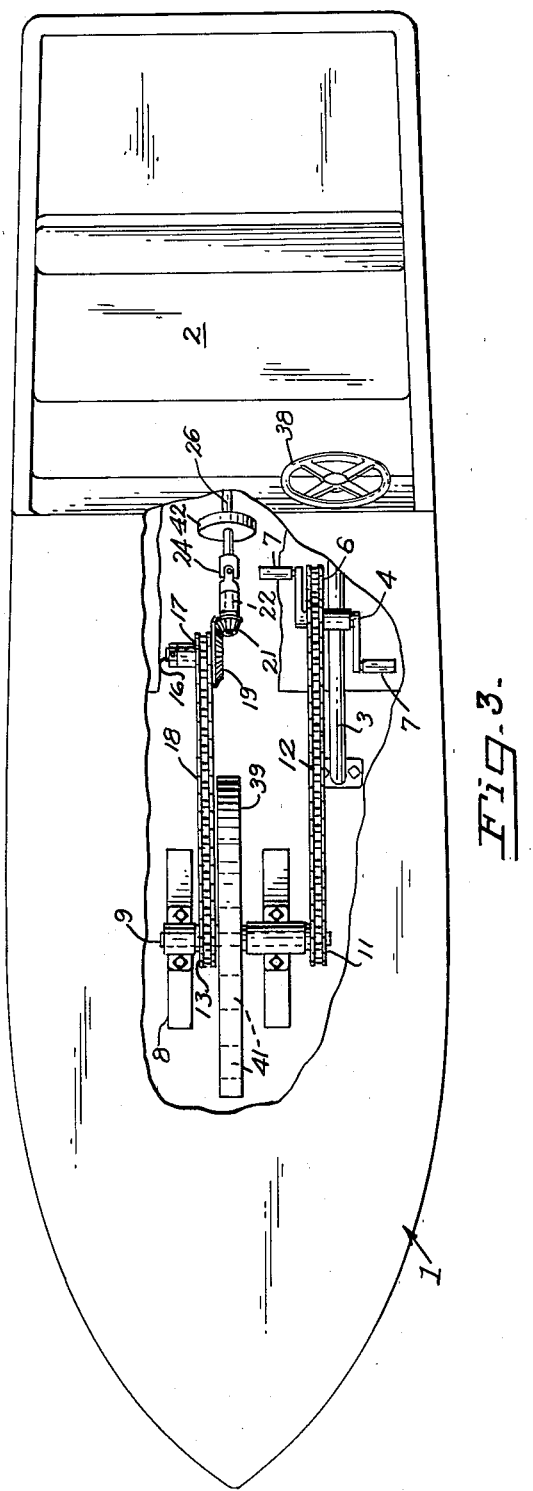
Fig. 3 is a top plan view of the boat, partly broken away to expose to view the drive and transmission mechanism.

The boat 1 may be constructed in any suitable shape in conventional manner and is provided with a seat 2 for the driver or person riding in the boat. One or more such seats may be provided. At a convenient distance from the seat 2 is provided a bracket 3 in which is journalled a drive axle 4 to support a pedal sprocket 6. This drive axle 4 is provided with pedals 7 on its opposite ends. The pedals 7 are of convenient leverage and distance to be engaged by the feet of the person occupying the seat 2 in the boat 1.

Another journal bracket 8 is provided in the hull of the boat 1 spaced forwardly and downwardly of the first bracket 3. A shaft 9 is journalled in the bracket 8. A second sprocket 11 secured on the shaft 9 is connected by drive chain 12 to the pedal sprocket 6 so as to be driven thereby and to impart rotation to the shaft 9.

On the shaft 9 is keyed or secured a large sprocket 13 considerably larger in diameter than either the second sprocket 11 or the first sprocket 6. A third bracket 14 is provided in the hull of the boat spaced toward and beneath the seat 2. In this bracket 14 is journalled a shaft 16 on which is a smaller sprocket 17 connected by a suitable drive chain 18 to the large sprocket 13 for transmission of rotation.

On the shaft 16 is provided a usual miter gear 19 driven by the shaft 16.

A second miter gear 21 is on a shaft 22 generally at right angles to the shaft 16 of the first miter gear 19 so as to transmit rotation generally axially or longitudinally of the boat 1. The shaft 22 is joined by suitable universal drive connection 24 to a propeller shaft 26.

The propeller shaft 26 is supported in suitable bearings 27 in the hull of the boat so as to incline downwardly toward the stern of the boat 1 and to extend through suitable packing 28 underneath the stern 29 of the boat 1. A suitable propeller 31 is mounted on the propeller shaft 26 so as to be below the waterline of the boat and propel the boat when rotated.

A rudder 32 is pivoted in a vertical tube 33 on the body of the boat 1 in a customary manner and its pin 34 is connected by suitable lines and mechanisms to a steering gear 37 in front of the seat 2. A steering wheel 38 on the steering gear 37 is conveniently located in front of seat 2 for easy steering of the boat by the person sitting in the seat 2.

In order to accomplish inertia drive a large inertia wheel 39 is fixed on the shaft 9 between the sprockets 11 and 13. This inertia wheel 39 is in the form of a disc with a plurality of circumferentially equally spaced plug weights 41 secured therein at equal radial distance from the center of the wheel 39 near the outer periphery of the disc wheel 39.

A flywheel 42 is fixed on the propeller shaft 26 near the universal joint 24 for exerting inertia force on the propeller shaft directly.

In operation, as the pedal sprocket 6 is rotated, it transmits rotation through the chain 12 to the forward shaft 9 which latter when rotated is also spun around by the large forward inertia wheel 39. Rotation is then transmitted by the sprocket 13, the chain 18 and sprocket 17 to the rear transverse shaft 16, and then through the miter gears 19 and 21 to the propeller shaft 26, which latter is also accelerated by the inertia of the rear flywheel 42.

The larger forward inertia wheel 39 and the smaller rear inertia wheel 42 are so proportioned that they contribute balanced inertia drive to the transmission. The axis of the smaller rear inertia wheel 39 is aligned with the center plane of the disc wheel 39 and is at right angles to the axis of the latter, and is also aligned generally with the center plane of the boat, so that the inertia wheels 39 and 41 provide balancing forces in the boat at right angles to one another.

The device herein described greatly facilitates the handling of a boat 1 and permits the propelling of the boat by the feet of the rider operating the pedals 7 in a manner of pedalling a bicycle.

As the boat is propelled in this manner, it is readily controlled both as to speed and as to stopping and maneuvering as desired for the purposes of the person in the boat. For instance, the person can fish conveniently sitting in the boat while maneuvering the boat at any desired speed and direction with great facility. The device is simple in construction, it is compact, is easily installed in boats and permits great flexibility of maneuvering and operation and is eminently adapted for its purposes. The larger forward inertia wheel 39 extends below the bottom 43 and into the keel 44 of the boat 1 so as to be more effective in stabilizing the boat.

I claim:

1. In a pedal mechanism for a boat having a seat therein for the user, a forward inertia wheel journalled between the seat and the bow of the boat, the plane of the inertia wheel coinciding with the center plane of the boat so as to stabilize said boat, a pedal driven transmission extending between said forward inertia wheel and said seat for rotating said inertia wheel, pedals of said transmission being in operative relation to said seat to be engageable by the feet of the user, a propeller shaft extended generally longitudinally to the stern of the boat, a propeller on the outer end of the propeller shaft to propel said boat, and transmission means to transmit rotation from said pedal driven transmission to said propeller shaft, and a transverse inertia wheel associated and rotated with the propeller shaft being spaced between said forward inertia wheel and the stern of the boat so that the axis of rotation of said transverse inertia wheel is aligned with said plane of said forward inertia wheel and the center plane of said boat.

2. The pedal mechanism defined in claim 1, where said forward inertia wheel projects into the keel of the boat and below the level of said seat for stabilizing the boat.

References Cited in the file of this patent

UNITED STATES PATENTS

| | | |
|---|---|---|
| 401,736 | Curlin | Apr. 23, 1889 |
| 636,412 | Marx | Nov. 7, 1899 |
| 769,693 | Forbes | Sept. 13, 1904 |
| 1,264,642 | Harley | Apr. 30, 1918 |
| 1,576,409 | Cashoty | Mar. 9, 1926 |

FOREIGN PATENTS

| | | |
|---|---|---|
| 3,664 | Austria | Mar. 21, 1901 |